United States Patent
Kobayashi et al.

[11] 3,836,321
[45] Sept. 17, 1974

[54] CLINKER COOLING EQUIPMENT AND METHOD

[75] Inventors: Hiroshi Kobayashi, Yokohama; Goro Okada, Tokyo, both of Japan

[73] Assignee: Babcock-Hitachi, Tokyo, Japan

[22] Filed: Aug. 1, 1973

[21] Appl. No.: 384,711

[30] Foreign Application Priority Data
Aug. 28, 1972 Japan.............................. 47-85357

[52] U.S. Cl...................... 432/15, 34/57 C, 432/80
[51] Int. Cl............................................. F27b 7/38
[58] Field of Search ........... 432/78, 80, 15; 34/57 C

[56] References Cited
UNITED STATES PATENTS

| | | | |
|---|---|---|---|
| 2,041,142 | 5/1936 | Norvig................................ | 432/78 |
| 2,103,170 | 12/1937 | Newhouse et al. ................... | 432/80 |
| 2,761,668 | 9/1956 | Sylvest............................... | 432/78 |
| 2,879,983 | 3/1959 | Sylvest............................... | 432/78 |
| 3,162,431 | 12/1964 | Muller et al. ........................ | 432/78 |

Primary Examiner—John J. Camby
Attorney, Agent, or Firm—Thomas E. Beall, Jr.

[57] ABSTRACT

A clinker cooling equipment comprising a grate type clinker cooler connected to a rotary kiln where clinker is calcined, said clinker cooler being sectioned into a high temperature section on the inlet side and a low temperature section on the outlet side, said high temperature section being cooled by high pressure cooling air and said low temperature section being cooled by low pressure cooling air, and several fluidized bed type cooler units branched off from said high temperature section whereby small-sized clinker grains contained in the clinker falling from the kiln are fluidized in the high temperature section and separated from other larger-sized clinker grains, the thus separated small-sized clinker grains being blown into said fluidized bed type coolers and cooled therein while the other clinker being cooled in said grate type clinker cooler. By separating the clinker falling from the kiln into two groups, namely fine-grain clinker and other clinker, and then cooling said both groups of clinker with separate equipment respectively, the expensive grate type clinker cooler can be made smaller in size and elongated in its service life, and also the inexpensive clinker cooling equipment with high cooling efficiency and low dust-containing exhaust gas can be served in operation.

6 Claims, 5 Drawing Figures

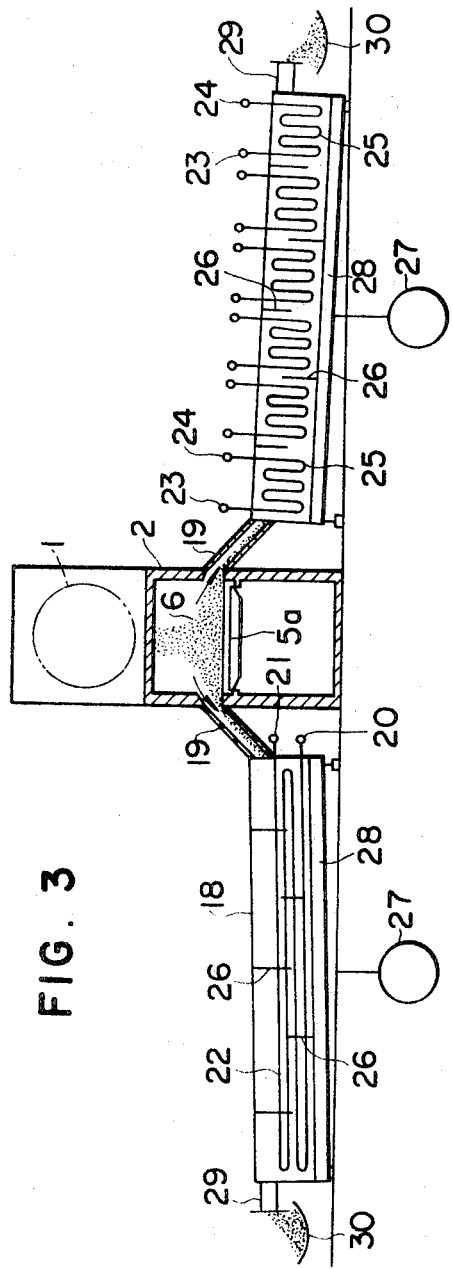
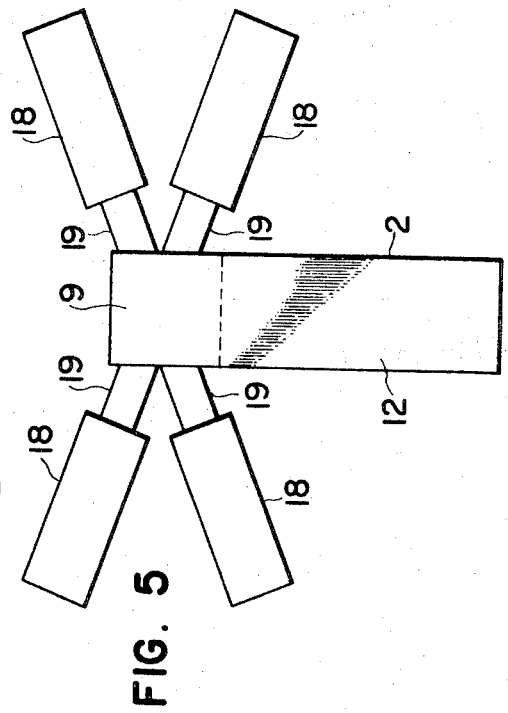
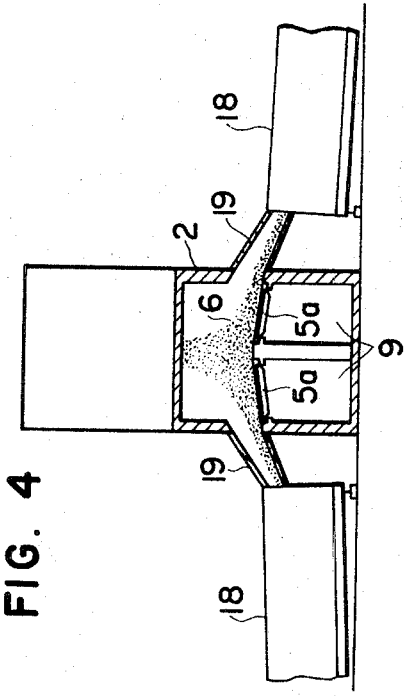
FIG. 3
FIG. 5
FIG. 4

CLINKER COOLING EQUIPMENT AND METHOD

BACKGROUND OF THE INVENTION

1. Field of the Invention

This invention relates to a clinker cooling equipment for cooling the red-hot cement clinker, lime or such, which has been calcined in a rotary kiln or the like, with air or other gas.

2. Description of the Prior Art

In general, the red-hot clinker calcined at 1,000° to 1,400°C in a rotary kiln is fed onto an oscillating grate of a grate type cooler from an inlet thereof and then carried toward the outlet while forming a clinker layer on said grate, and during carriage toward the outlet the clinker is cooled by pressurized air or other gas blown from below the grate. Of the air which has been raised in temperature through heat exchange with the clinker, that portion of air which comes from the high temperature section is recovered and led into the kiln for use as secondary combustion air to save fuel consumption, while the remainder of said air is either used for drying the raw material or released into the atmosphere.

However, the clinker grains falling on the grate in the grate type cooler vary widely in size, from less than 1 mm in diameter to greater than 1,000 mm, so that it is undersirable to perform cooling of such clinker grains of varied sizes being muddled up on the grate for the following reason. That is, the pressure loss of cooling air passing through the clinker layer is varied both locally and throughout the entire layer due to difference in size of the clinker grains forming the layer on the grate and also due to the difference of the particle size distribution in a unit area on the grate. For example, such part of the clinker layer which is mostly composed of small-sized grains has high air-flow resistance to make it difficult for the cooling air to pass therethrough, while the clinker layer part where large-sized clinker grains are gathered has low air-flow resistance to allow easy flow of cooling air therethorugh. Thus, a large difference appears in cooling effect between said both parts of the clinker layer.

Further, as the cooling air passing through the clinker layer part with low air-flow resistance is raised in flowing speed, the fine grains positioned around the coarse grains may be blown up and accompany the secondary air supplied into the kiln, thus producing undesirable results in operation and control of the kiln. Also, when the used secondary air is discharged out as exhaust gas, the fine grains may flow into the dust collector to result in the undesirable increase of the load of the dust separating equipment.

Still further, since the clinker layer with high air-flow resistance lowers the flow rate of cooling air to lower the cooling effect, it becomes necessary to increase the number of stages of the grate plates which are made from materials to bear a high temperature. Further, the amount of dust falling below the grate from the perforated holes in the grate plates also increases and raises the load of the drag chain conveyor provided under the grate.

Therefore, in order to accomplish the clinker cooling most economically, it is desirable to separate the clinker grains discharged from the kiln (such clinker grains varying widely in size, from less than 1 mm in diameter to greater than 1,000 mm) into fine grains and coarse grains (or the grains greater in size than the "fine grains") according to the grain diameter and to perform cooling separately over these separated clinker grain groups in a way best suited for the respective group.

When both fine-grained clinker and coarse-grained clinker are cooled together in a same grate type cooler, even if the amount of cooling air is increased a, substantial portion of such cooling air passes through other parts of the clinker layer than where the fine grains are assembled, and also since such fine grains are usually separated from other grains and gathered locally, no sufficient cooling air is given to such locality, and hence, in an extreme case, this results in discharging fine grains from the outlet of the cooler while still in a red-hot state. Also, if the amount of cooling air supplied is reduced to lessen the degree of separation of the fine clinker grains, cooling of both fine-grained clinker and coarse-grain clinker may become insufficient to cause troubles such as overheat of the grate plates.

In order to realize effective cooling of clinker of all grain sizes, it has been attempted in the past to provide a screen at the inlet of the grate type cooler (near the point where the clinker falls on the grate from the rotary kiln) to thereby separate the clinker into coarse grains and fine grains, with said respective grains being cooled separately with a pertinent amount of cooling air. However, the clinker falling into the cooler from the kiln is red-heated to about 1,200° to 1,400°C, and also such red-heated clinker is sticky and also coagulative so that such clinker is liable to adhere to the screen and may grow into a conical mass like a stalagmite to disturb flow of secondary air or to cause clogging of the screen meshes, and finally it may become impossible to continue operation of the cooler.

It is therefore an object of the present invention to provide a novel clinker cooling equipment which is free of above-said defects.

It is another object of the present invention to provide a clinker cooling equipment whereby the clinker of any grain size, varying from large-sized masses to small grains, can be cooled at high efficiency.

SUMMARY OF THE INVENTION

The principle of this invention is based on the fact that the fine grain clinker cooled to around 1,000°C has the nature to be easily fluidized, notwithstanding its sticky and coagulative nature at the high temperature, say 1,200°C to 1,400°C.

The clinker cooling equipment according to the present invention, which is based on the above-said principle, comprises a grate type cooler connected to a kiln, said cooler being sectioned into a high temperature section on the inlet side and a low temperature section on the outlet side, said high temperature section being supplied with cooling air of higher pressure than the cooling air supplied into the low temperature section to cool the clinker falling down from the kiln to a temperature of around 1,000°C so as to fluidize the fine-grained clinker on the grate in the high temperature section and separate such fine-grained clinker from other clinker (of larger grain sizes); the thus separated fine-grained clinker being then led into the fluidized bed type coolers provided branching off the high temperature section to effect cooling therein while the other clinker being guided into the low temperature section in said grate type cooler and cooled therein.

BRIEF DESCRIPTION OF THE DRAWINGS

FIG. 3 is a sectional view taken along the line A—A of FIG. 2;

FIG. 4 is a schematic sectional view of a cooling equipment according to another embodiment of the present invention; and FIG. 5 is a plane view of still another embodiment of the present invention.

DETAILED DESCRIPTION OF THE INVENTION

Figure 1:
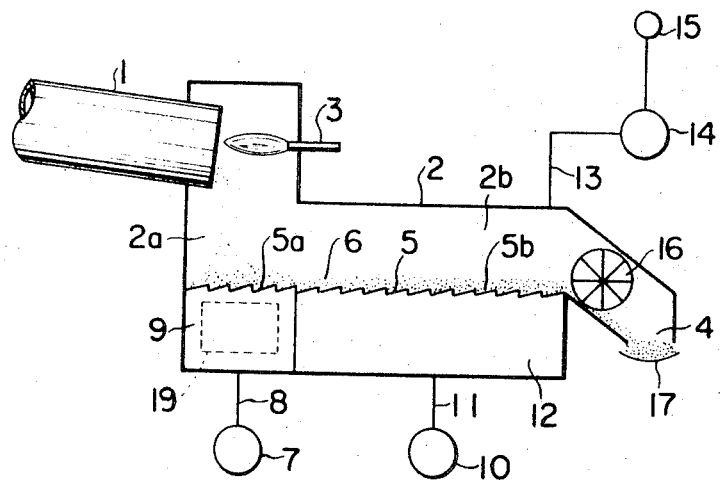
FIG. 1 is a schematic sectional view of a cooling equipment according to the present invention.
Figure 2:
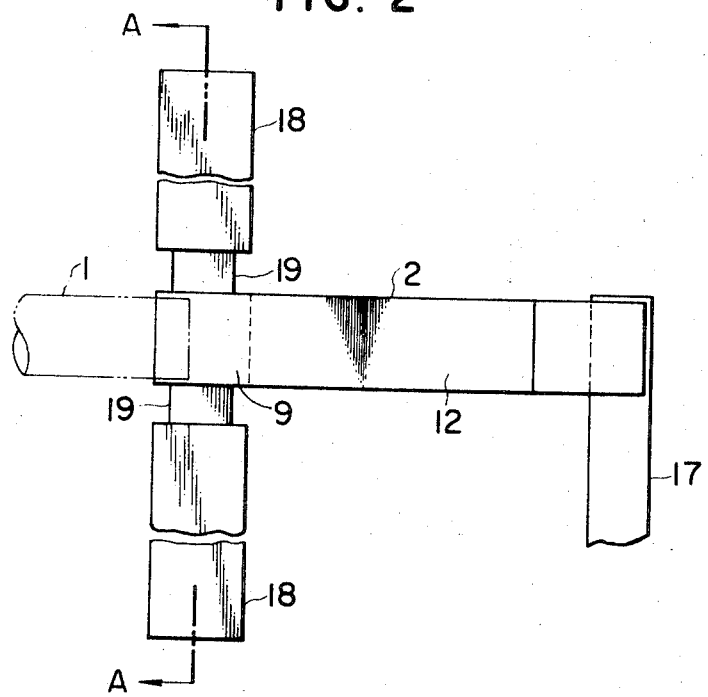
FIG. 2 is a schematic plane view of the equipment shown in FIG. 1.

Referring to FIGS. 1, 2 and 3 of the drawings, reference numeral 1 indicates a rotary kiln, 2 a grate type cooler connected to said kiln 1, and 3 a burner provided at the juncture of said kiln 1 and cooler 2 for heating said kiln 1. The cooler 2 is compartmented into a high temperature section 2a on the side connected to the kiln 1 and a low temperature section 2b on the clinker discharge port 4 side. A high temperature grate 5a is disposed in said high temperature section 2a and a low temperature grate 5b is provided in the low temperature section 2b. The clinker falling into the cooler 2 from the kiln 1 is received on the high temperature grate 5a and, while forming a clinker layer 6, carried successively onto the low temperature grate 5b and further toward the clinker discharge port 4. The high temperature grate 5a is made of a heat-resisting metal material of higher quality than the material composing the low temperature grate 5b. Cooling air supplied from a high pressure cooling air fan 7 (air pressure being several thousand mmH$_2$O) is guided through a conduit 8 into a high pressure air plenum chamber 9 provided below the grate 5a and passes through the grate 5a to cool the clinker layer 6 thereon, while the cooling air supplied from a low pressure cooling air fan 10 through a conduit 11 into a low pressure air plenum chamber 12 provided below the grate 5b passes through said grate 5b to cool the clinker layer 6 thereon.

Of the air which has passed through the clinker layer 6 on said grates 5a and 5b and undergone heat exchange with said clinker layer, that portion of such air which stays on the high temperature side is blown toward the kiln 1 to perform heat exchange with the clinker falling down from the kiln 1 to cool such clinker of 1,200° to 1,400°C to a temperature of around 1,000°C while at the same time serving as combustion air for the burner 3, and after thus used, said portion of air is guided into the kiln 1. On the other hand, the remaining portion of air on the low temperature side flows into an exhaust air conduit 13 and, after passing through an exhaust air fan 14 (usually a dust collector being provided in front of said fan), said air is released into the atmosphere through an exhaust stack 15.

On both sides of the grate type cooler 2 are provided fluidized bed type coolers 18 which branch off from the high temperature section 2a and are connected to said cooler 2 by chutes 19 adapted to receive the fine-grained clinker falling to both sides of the high temperature grate 5a.

The clinker falling into the cooler 2 from the kiln 1 is accumulated in the form of a cone centering about the point at which the clinker drops on the high temperature grate 5a, but since such clinker is already cooled to around 1,000°C while it is falling down, the fine-grained clinker is fluidized and bounces out on the surface of the cone-shaped clinker layer 6 and flows thereon in the direction of arrows (see FIG. 3). Thus, the fine-grained clinker alone flows into the fluidized bed type coolers 18 through the respective chutes 19 as shown in FIG. 3. Each said chute 19 is preferably made of a heat resisting material or composed with a water-cooled wall so that the high temperature fine-grained clinker will be blown down smoothly without adhering to the chute wall.

Generally, fluidization of clinker on the grates is influenced by various factors such as cooling air pressure, temperature, velocity, clinker layer thickness, etc., but if such conditions are substantially same, fluidization depends on the grain size of the clinker. That is, the clinker grains smaller than a certain grain size are fluidized but other clinker grains larger than such critical grain size are not fluidized.

Since the coarse clinker grains are not fluidized, they are left on the high temperature grate 5a and carried in the form of a clinker layer 6 from said grate 5a to the low temperature grate 5b. The large masses contained in the clinker layer 6 are crushed by a hammer breaker 16 and the crushed clinker pieces are bounced back onto the grate 5b where they are again cooled and discharged out from the discharge port 4 together with other clinker grains onto a conveyor 17 whereby they are further carried to other site.

In each unit of said fluidized bed type coolers 18 are provided cooling pipes 22 (horizontal) for cooling the high temperature fine-grained clinker, each said pipe 22 having headers 20 and 21, or cooling pipes 25 (vertical) each having headers 23 and 24. There are also provided baffle plates 26 adapted to prevent flow-down of the fine grains on the surface of the fluidized clinker layer in each said cooler 18. Whether the horizontal or vertical cooling pipes are to be used is determined by the cooling conditions involved.

The high temperature small-sized clinker grains blown into each said fludized bed type cooler 18 from the rotary kiln 1 through the chute 19 are fluidized and cooled by the air jetted out from a fluidizing air chamber 28 through a porous fluidizing bed plate by an air blower 27, and the thus fluidized grains then undergo rapid heat exchange in the cooling pipes 22 and 25, with the cooled grains being discharged out from an outlet 29 onto a conveyor 30. Preferably, each said fluidized bed type cooler 18 is slightly slanted to facilitate flow of the fine grains toward the outlet 29, and it is also desirable to make arrangement such that the slant of said cooler can be adjusted as desired.

As described above, according to the present invention, the clinker masses which have fallen from the kiln 1 onto the grate 5a in the high temperature section 2a in the grate type cooler 2 are separated into small-sized grains and larger-sized grains or masses, and the larger-sized grains or masses are cooled while they are carried on the grate 5b in the low temperature section 2b toward the outlet 4. Thus, as only the coarse grains (after removal of the fine grains) are cooled by the grate type cooler, the air-flow resistance of the clinker layer on the grate is greatly lessened to allow most effective cooling and great economization of power as compared with the case where the clinker of all grain sizes is cooled all together. Further, overheating due to insufficient air supply and wear are minimized and also fine clinker dust is scarcely contained in the exhaust gas, thus allowing long-time continuous operation of the apparatus with no trouble. In addition, the very expensive grate type cooler can be reduced in size.

On the other hand, the small-sized clinker grains can be cooled effectively by using the fluidized bed type coolers which are inexpensive and suffer little wear and damage by overheating. Thus, the present invention has great economical advantages in its equipments and cooling efficiency.

Further, if a substantial portion of the fine clinker grains are cooled by the cooling pipes provided in each fluidized bed type cooler, the amount of dust-containing exhaust gas released into the atmosphere through the exhaust stack can be reduced greatly, thus producing additional significant effect for prevention of air pollution and economization of the dust collector means.

If the mean cooling air velocity through empty bed (with no clinker layer 6 present on the high temperature zone grate 5a) is set at 2 to 3 m/sec, the fine clinker grains with grain size of less than 5 mm in the clinker layer 6 are completely fluidized. In a kiln with a capacity on the order of 4,000 ton/day, about 30 percent of fine grains are contained therein and such grains fall together with other size clinker from the kiln onto the grate. There is a tendency that the rate of the small-sized grains contained in the clinker to be cooled is increased, although there exist some difference according to the type of the kiln used, as the size of the kiln is enlarged. It is expected that the rate of such fine clinker grains will exceed 50 percent in a 10,000 ton/day capacity kiln. Therefore, the cooling equipment of the present invention is considered to become even more advantageous in future applications.

FIG. 4 shows another embodiment of the present invention, where the grate 5a provided in the high temperature section 2a in the grate type cooler 2 is slightly inclined toward the chute 19 to facilitate inflow of the separated fine clinker grains toward the chute 19.

FIG. 5 shows still another embodiment of the present invention, in which several fluidized bed type coolers 18 branched off from the high temperature section 2a in the grate type cooler 2 are arranged radially.

The effects obtained from these embodiments are substantially same as those already described in connection with FIGS. 1 to 3.

What is claimed is:

1. An improvement to clinker cooling equipment having a grate type cooler connected to a rotary kiln where the clinker is calcined, said grate type cooler being sectioned into a high temperature section on the inlet side and a low temperature section on the outlet side, said high temperature section being supplied with high pressure cooling air for performing clinker cooling therein while said low temperature section being supplied with low pressure cooling air for effecting clinker cooling therein, wherein the improvement comprises in combination: a separate fluidized bed type cooler separate from and spaced from the grate type cooler; means separating the small sized clinker grains contained in the clinker falling down from the kiln from the remaining larger sized clinker grains in the high temperature section of said grate type cooler; means conducting only the thus separated small sized clinker grains directly from the high temperature section to said fluidized bed type cooler for further cooling therein; and means for conducting only the remaining thus separated larger sized clinker grains from the high temperature section to the low temperature section of said grate type cooler.

2. The invention of claim 1, wherein said grate type cooler has a general direction of clinker movement from the kiln through the high temperature section and the low temperature section, and wherein said fluidized bed type cooler extends laterally from said high temperature section; and said grate type cooler having a clinker supporting grate within the high temperature section that is inclined gently downwardly and toward the laterally disposed fluidized bed type cooler.

3. The invention of claim 1, wherein there are two substantially identical mirror image fluidized bed type coolers extending laterally from and on each side of said high temperature section of said grate type cooler, and said means for conducting only the small sized clinker grains divides the thus separated small sized clinker grains between said two fluidized bed type clinker coolers.

4. The invention of claim 3, wherein said grate type cooler, within said high temperature section, has a grate for supporting the clinkers directly beneath the clinker inlet from the rotary kiln, which grate, in transverse cross section, is substantially the shape of an inverted V so as to have opposite sides sloping respectively toward said two fluidized bed type coolers.

5. The invention of claim 1, wherein said means separating the small sized clinker grains from the larger sized clinker grains consists of means blowing high pressure high volume air upwardly through said grate type cooler within said high temperature section immediately beneath the kiln outlet to fluidize the small-sized clinker grains before they fall to the grate of the grate type cooler, and said means for conducting only the thus separated small-sized clinker grains includes at least one passage extending transversely from the grate type cooler immediately adjacent the rotary kiln outlet where the clinkers fall, to receive the thus fluidized bed of small-sized clinker grains before they travel a substantial distance along the conveying direction of the grate type cooler.

6. A method of cooling clinker discharged from a rotary kiln onto a grate type cooler having a high temperature section with high pressure cooling air being blown therethrough and a low temperature section with low pressure cooling air being blown therethrough, comprising the steps of: separating the small-sized clinker grains from the larger-sized clinker grains as the mixed clinker drop from the rotary kiln outlet downwardly toward the grate type cooler; fluidizing only the thus separated smaller-sized clinker grains before they reach the grate of the grate type cooler; conducting the thus separated and fluidized small-sized clinker grains as a fluidized bed to a fluidized bed type clinker cooler; cooling the thus separated small-sized clinker grains within the fluidized bed type cooler; and cooling the thus separated larger-sized clinker grains only within the grate type cooler separate from the fluidized bed type cooler.

* * * * *